United States Patent [19]

Mitchell

[11] Patent Number: 4,920,561
[45] Date of Patent: Apr. 24, 1990

[54] RING DETECTOR FOR TELEPHONE LINE

[75] Inventor: Andrew C. Mitchell, Chelmsford, Mass.

[73] Assignee: Scully Signal Company, Wilmington, Mass.

[21] Appl. No.: 263,716

[22] Filed: Oct. 28, 1988

[51] Int. Cl.⁵ .............................................. H04M 1/00
[52] U.S. Cl. ...................................... 379/106; 379/97; 379/373; 379/382
[58] Field of Search .................... 379/106, 107, 96–98, 379/382, 385, 386, 373, 375, 377

[56] References Cited

U.S. PATENT DOCUMENTS

| | | | |
|---|---|---|---|
| 4,184,053 | 1/1980 | Saneyoshi | 379/373 |
| 4,451,707 | 5/1984 | Hanscom | 379/373 |
| 4,536,619 | 8/1985 | Hamatani et al. | 379/386 |

*Primary Examiner*—Jin F. Ng
*Assistant Examiner*—Wing F. Chan
*Attorney, Agent, or Firm*—Wolf, Greenfield & Sacks

[57] ABSTRACT

The invention provides a low cost ring signal and pulse dial signal detector which can be used in conjunction with a device adapted for carrying out digital communication over a telephone network. The invention comprises a zener diode coupled in series with a snubber circuit that is connected in parallel to the switchhook of the telephone communication device. When the switchhook is open circuited, the zener diode creates high frequency harmonics of any signals on the telephone line such as ring and pulse dial signals. Certain of the harmonics of the ring and pulse dial signals will be within the bandwidth at which the telephone communicating device is tuned to receive communications. Therefore, since the telephone communicating device is already adapted to receive signals at a specified frequency within the communication bandwidth of the telephone network (300–3000 Hz), the addition of the zener diode prvides all of the apparatus necessary to allow for ring and pulse dial signal detection.

20 Claims, 2 Drawing Sheets

RING DETECTOR FOR TELEPHONE LINE

FIELD OF THE INVENTION

The invention relates to an apparatus for detecting a ring signal or a pulse dial signal on a telephone line. More particularly, the invention relates to an apparatus for preventing a device adapted for digital communications over telephone lines from attempting to initiate a telephone call when the telephone station at which the device is located is either receiving an incoming ring signal or a pulse dial telephone sharing that station is initiating a call.

BACKGROUND OF THE INVENTION

In conventional devices which communicate over telephone lines, most of the telephone line interface circuitry is connected to the telephone line by a mechanical switchhook. In this manner, the interface circuitry is not coupled to the line when the device is "on-hook" and the switchhook is open-circuited. Such an arrangement protects the devices from damage from noise bursts on the telephone line such as are caused by lightning strikes or other electrical surges. However, devices which receive incoming calls must monitor the line at all times to detect ringing. Consequently, a ring detector circuit is conventionally directly coupled to the line. In addition, a "snubber" circuit, comprising a resistor in series with a capacitor, is frequently connected across the switchhook in order to protect the switchhook contacts from destructive arcing.

In an ordinary telephone, the switchhook contacts are closed to connect the telephone to the line when the handset is lifted from its cradle. In many electronic devices, the device closes the switchhook contacts in response to the detection of incoming ringing by the ring detector or automatically closes the contacts when the device wishes to contact another location over the line.

Problems are created when two or more electronic devices are connected to the same telephone line or when an electronic device is connected together with an ordinary telephone to a single line. In these situations, the ring detector cannot be designed so that the device "answers" the telephone every time ringing is detected, since the incoming call may not be intended for that device. Therefore, these devices generally include time delays or are designed only to make outgoing calls and not to answer any incoming calls. However, even devices which make only outgoing calls must monitor the telephone line to determine when the line is in use or incoming ringing is present. In the former case seizure of the telephone line would interrupt use of the line by the established party. In the latter case a connection will be established with a calling party even though nothing has answered the phone. Consequently, such devices must incorporate a ring detector.

An example of an electronic device which automatically initiates calls is a sensing device such as that disclosed in application U.S. Pat. No. 06/907,120 entitled RESIDENTIAL FUEL OIL SENSOR, filed on Sept. 12, 1986, now U.S. Pat. No. 4,845,486 by John D. Knight and assigned to the same assignee as the present invention which application is hereby incorporated by reference. In the disclosed system, a sensor located in a residential home initiates a telephone call to a central location when the level of oil in the residential tank is low. Since it is usually not economically feasible to provide a dedicated telephone line for such a sensor, the sensor is normally connected to the existing residential telephone line. Accordingly, the sensor incorporates a ring detector to monitor the line so that the sensor will not initiate a call if the line is in use or if ringing is present on the line.

A typical prior art ring detector comprises several electronic components which together constitute a substantial portion of the cost of the sensor. In a situation like that disclosed in the aforementioned application, where a large number of sensor devices must be used to implement a total system, conventional ring detectors add a substantial cost to the alarm system.

Such sensor devices must typically contain circuitry to receive and process electronic information received from the central location, but the electronic information is usually transmitted and received over the normal telephone communication bandwidth (300 Hz–3000 Hz). Thus the exisitng circuitry cannot be used to detect ringing and dial pulses which are normally outside the communication bandwidth.

Therefore, it is an object of the present invention to provide an improved ring signal detector.

It is an another object of the present invention to provide a simple and inexpensive means for detecting ring signals.

It is a further object of the present invention to provide a ring detector which can also detect a pulse dial signal on a telephone line.

It is yet another object of the present invention to provide improved immunity to noise on the telephone line.

SUMMARY OF THE INVENTION

In accordance with the above objectives, the present invention provides for simplified ring detection in electronic devices which contain circuitry that receives information over the telephone line within the normal communication bandwidth. The inventive ring detector comprises circuitry which converts ringing and dial pulses to intermediate signals within the normal communication bandwidth. The intermediate signals can then be processed by the existing receiver circuitry.

More particularly, the inventive ring detector comprises a zener diode placed in series with the snubber circuit conventionally coupled across the switchhook. When the device is on-hook, incoming ringing current causes the zener diode to produce high-frequency harmonics of the ringing current such that, even though the ring signal is not within the communication bandwidth, the high frequency harmonics are within the communication bandwidth at which the electronic apparatus communicates over the telephone lines. Thus the existing receiver circuitry can be used, without any modifications, to detect ringing.

Since the zener diode would also produce harmonics of any pulse dial signals on a telephone line, the existing receiver circuitry would also be able to detect pulse dial signals produced by a rotary telephone coupled at the same telephone station as the device.

The zener diode also provides immunity from low amplitude noise because it provides a predetermined dead-band within which no incoming signals are passed to the receiver circuitry. For instance, if a zener diode with a dead-band of 20 volts is used, any signal having peak-to-peak amplitude of less than 20 volts will not cause the zener diode to go into either forward or re-

DETAILED DESCRIPTION OF A PREFERRED EMBODIMENT

Figure 1:
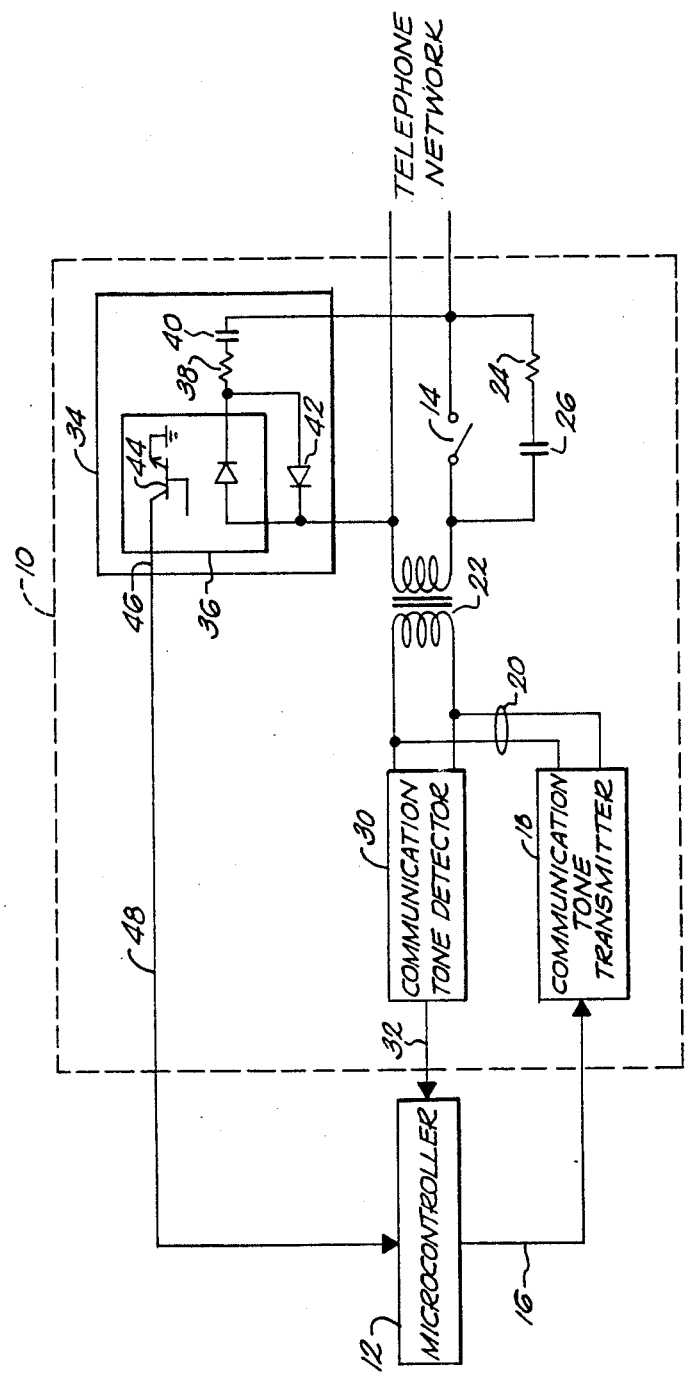
FIG. 1 shows a prior art device adapted to carry out digital communications over the telephone network using a prior art ring detector.

FIG. 1 shows a block diagram of a typical prior art telephone interface 10 (such as a modem) for an electronic device (such as the sensor device disclosed in the aforementioned patent application). Modem 10 is coupled to a microcontroller 12 of the sensor Microcontroller 12 is, in turn, coupled to a programmable switchhook 14 so that microcontroller 12 can place the telephone line off-hook when an outgoing telephone call is to be initiated (or an incoming telephone call is to be answered). After the telephone line has been seized, digital information and/or instructions from microprocessor 12 can be sent to communications tone transmitter 18 over line 16. Communications tone transmitter 18 converts digital signals on line 16 to an analog signal which can be transmitted over the telephone line. Typically, transmitter 18 would convert the digital signals to either frequency-modulated or pulse-modulated analog signals. The output 20 of transmitter 18 is coupled to the telephone line through a conventional isolation transformer 22.

Coupled in parallel with switchhook 14 is a snubber circuit comprising resistor 24 and capacitor 26 as previously described. When switchhook 14 is off-hook or closed, microcontroller 12 can receive information and instructions from the telephone line through transformer 22 and tone detector 30. Detector 30 is conventional in construction and comprises circuitry which can convert an incoming analog signal into a digital signal. The digital signal is supplied to microcontroller 12 over line 32.

Ring detector circuit 34, as described above, is coupled to the telephone line at a point before switchhook 14 so that it can detect ring signals when the switchhook 14 is on-hook. A typical prior-art ring detector 34 comprises a light emitting diode (LED) 36 coupled in series with resistor 38 and capacitor 40. Diode 42 is coupled in parallel with LED 36 to allow the alternating ringing current to flow in both directions. The light generated by LED 36 in response to ringing current falls upon phototransistor 44 which forms a simple op-to-isolator. Phototransistor 44 connects line 48 to ground in response to light from LED 36. Line 48 is, in turn, coupled to microcontroller 12. Microcontroller 12 is programmed so that it will not attempt to make an out-going call when the following two conditions exist: (1) switchhook 14 is on-hook and (2) a ringing is detected.

The ring detector of the present invention will now be described in detail in relation to a specific embodiment wherein the invention is embodied within a sensor/reporting device as previously described. It should be understood that a ring detector of the present invention may be embodied within a wide variety of telephone communication devices and is not intended to be limited to devices described herein.

Figure 2:
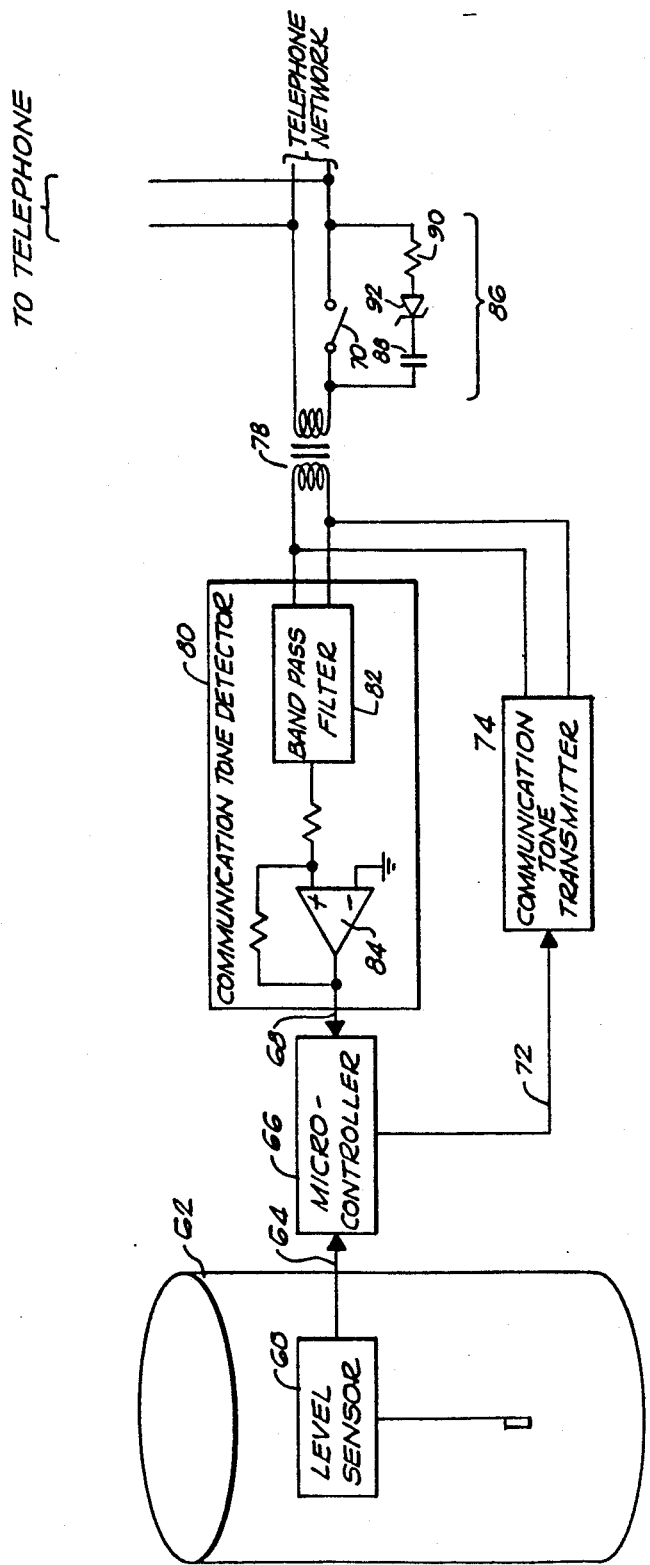
FIG. 2 shows the ring detector of the present invention embodied in an exemplary device such as a residential fuel-oil level alarm system for carrying out digital communications over the telephone lines.

FIG. 2 shows a sensor system embodying the present invention. Level sensor 60 is disposed within a residential fuel-oil tank 62. The sensor 60 is designed to output a signal on line 64 to the microcontroller 66 when the level of fuel in the tank 62 drops below a specified level. The microcontroller 66, in response to a low oil signal on line 64, checks the information present on line 68 to determine if either an incoming ring signal or an outgoing pulse dial signal is present on the telephone line. If there are no such signals on line 68, the microcontroller 66 closes programmable switchhook 70, waits for a dial tone and sends out data on line 72 in order to report the low oil level condition. The data on line 72, might typically comprise the electrical signals necessary to dial the telephone number at which the system CPU is located followed by the data stream reporting the address of the device 50 and the level of oil in the tank 62. The data on line 72 is fed into a communication tone transmitter 74 wherein it is modulated and converted to electrical signals which can be transmitted over the telephone network. The output of the communications transmitter 74 is coupled to the telephone network through transformer couple 78.

The microcontroller is programmed so as not to attempt to make an outgoing call to the CPU at a time when an incoming ring signal is being received. This is because an incoming signal indicates an incoming call which, if the microcontroller were to close the switchhook 70, would be answered even though the telephone call was not intended for the device. Further, the device is prevented from initiating an outgoing call when a pulse dial signal is present on the telephone line. This is because the closing of the switchhook 70, necessary for making an outgoing call, would be detected on the telephone line as part of the number currently being dialed and would therefore destroy the integrity of the telephone number being dialed. It should be noted, that the dial pulse created by the closing of the switchhook 70 would not effect the integrity of a number being dialed on a DTMF telephone since such a telephone does not use dial pulses to dial telephone numbers.

Further, it is not of particular concern if the microcontroller 66 closes the switchhook 70 and attempts to make an outgoing call while the telephone line is currently engaged in communication from that station, since the microcontroller will not receive a dial tone and, therefore, will attempt to make a call at a later time.

The microcontroller will wait to receive an acknowledge signal from the central location acknowledging receipt of the information. If the acknowledge signal is not received after a specified period of time, the microcontroller will open the switchhook 70 to relinquish the telephone line, and attempt to report at a later time.

The ring signals, pulse dial signals and communications signals from the central office are all supplied to the microcontroller 66 on line 68 through hybrid transformer 78 and communication tone detector 80. In one illustrative embodiment of the fuel-oil level alarm system, communication over the telephone lines is accomplished by amplitude modulating the digital data using a carrier of 350 Hz. Communication tone detector 80 comprises a six-pole bandpass filter 82 tuned to pass a narrow range of frequencies centered at 350 Hz. Hysteretic comparator 84 converts the current pulses which it receives through bandpass filter 82 into digital information which can be read by the microcontroller 66. Ring signals and pulse dial signals cause abrupt, repetitive changes in the signal passing through bandpass filter 82. Comparator 84 changes state in response to the abrupt changes at the output of bandpass filter 82 thus providing a stream of 1s and 0s to microcontroller 66 in response to ring signals and pulse dial signals.

When switchhook 70 is on-hook, all signals on the telephone line go through snubber circuit 86, which comprises capacitor 88, resistor 90 and, according to the present invention, zener diode 92 coupled in parallel with the switchhook 70. Of particular concern to the present invention are the ring signals and pulse dial signals on the telephone line. In one preferred embodiment, zener diode 92 is chosen to have a dead-band of 20 volts. In general, ringing signals on the telephone network are in the frequency range of 15.3-68 Hertz and have a magnitude of 40 to 150 volts A.C. superimposed on a base level of 52.5 volts DC. Pulse dialing signals typically have a frequency of approximately 10 Hz and a magnitude of 50 volts peak-to-peak. Since the dead-band produced by Zener diode 96 is only 20 volts, either of these signals will activate Zener diode 96 in both forward and reverse conduction.

In accordance with the invention Zener diode 96 will create high-frequency harmonics of both the pulse dial signal and the ring signal when switchhook 70 is on-hook. Some of these high-frequency harmonics will be within the pass band of filter 82. For instance, if the ring signal happens to be a 20-Hz signal, the 15th and 16th harmonics of the ring signal will be 340 and 360 Hertz, respectively. These harmonics will pass through the filter 82 and comparator 84 into the microcontroller 66 on line 68. The microcontroller 66, detecting that switchhook 70 is on-hook and that there are signals on the telephone line, will not attempt to make an outgoing call at this time. When switchhook 70 is off-hook, the switchhook contacts short Zener diode 92. Consequently, the signals on the telephone line will not flow through the Zener diode 92 and harmonics will not be created of the signals.

Zener diode 96 also provides noise immunity by providing a dead-band of 20 volts. Signals less than 20 volts peak-to-peak will cause the capacitor 88 to hold a steady-state voltage such that Zener diode 96 does not go into forward or reverse conduction and no signal is passed to the detection circuit. Further, in this particular embodiment, additional noise rejection is provided by the hysteretic comparator 84 which rejects signals from the bandpass filter 82 which are below approximately ½ volt peak-to-peak. Even further, the software in the microcontroller 66 can be designed to ignore isolated signals from communication tone detector 80 to provide additional noise immunity. Since ring and dial pulse signals generate pulse trains at anywhere from 10-60 Hz, isolated pulses from the communication tone detector 80 can be completely ignored without fear of failing to detect a ring or pulse dial signal.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended, to be within the spirit and scope of the invention. Accordingly, the foregoing description is by way of example only, and not limiting.

The invention is limited only as defined in the following claims and equivalents thereto.

What is claimed is:

1. In a communication device for receiving information over a telephone line, said device having receiver circuitry for receiving information having frequencies within the telephone voice band and extracting data therefrom, an apparatus for detecting incoming ring signals and outgoing pulse dial signals on said telephone line, said apparatus comprising:
    means responsive to said incoming ring signals and to said outgoing pulse dial signals for generating intermediate signals having frequencies within said telephone voice band;
    means for providing said intermediate signals directly to said receiver circuitry so that said receiver circuitry can extract ringing and dialing data therefrom; and
    means responsive to said ringing and dialing data for detecting incoming ring signals and outgoing dial pulses on said telephone line.

2. An apparatus for detecting incoming ring signals and outgoing pulse dial signals on a telephone line having a snubber circuit coupled in parallel with a switchhook, said apparatus comprising:
    a zener diode coupled in series with the snubber circuit for providing high frequency harmonics of the ring signals and pulse dial signals; and
    a tone detector circuit coupled to receive the output of the snubber circuit and zener diode combination, the tone detector being tuned to detect a specified range of frequencies, the range of frequencies comprising at least one harmonic of the ring signals.

3. An apparatus as set forth in claim 2 wherein the snubber circuit comprises a resistor and a capacitor coupled in series.

4. An apparatus as set forth in claim 3 wherein the zener diode is coupled in series with the resistor and capacitor.

5. An apparatus as set forth in claim 4 wherein the tone detector circuit is coupled to receive the output of the snubber circuit and zener diode combination through a transformer couple.

6. An apparatus as set forth in claim 5 wherein the zener diode has a dead-band of substantially 20 volts.

7. An apparatus for providing communication over a telephone network at a specified frequency range within the bandwidth provided by the telephone network for voice communication, and wherein incoming ring signals used by the network are of a frequency lower than the voice communication bandwidth of the network, said apparatus comprising;
    a microcontroller programmed to carry out communication protocol over the telephone network;
    a communications tone detector for detecting signals on the telephone network at said specified frequency range and converting the detected signals to digital information readable by the microcontroller;
    means for coupling the communications tone detector to the telephone network;
    a zener diode coupled between the telephone network and the communications tone detector for producing harmonics of signals present on the telephone line such that at least one of said harmonics of said incoming ring signals is within said specified frequency range.

8. An apparatus as set forth in claim 7 wherein the zener diode is coupled in parallel with a switchhook such that said zener diode operates to produce said harmonics when said switchhook is open circuited.

9. An apparatus as set forth in claim 8 wherein the zener diode is coupled in series with a snubber circuit.

10. An apparatus as set forth in claim 9 wherein the snubber circuit comprises a resistor coupled in series with a capacitor and further wherein the zener diode is coupled in series between the capacitor and the resistor.

11. An apparatus as set forth in claim 10 wherein the means for coupling comprises a transformer couple.

12. An apparatus as set forth in claim 11 wherein the zener diode has a dead-band of substantially 20 volts.

13. In an apparatus having means to close a switchhook to initiate a telephone call from a telephone station over a telephone network; means for preventing the apparatus from closing the switchhook when a ring signal is incoming to the apparatus or when an outgoing call is being dialed on a rotary telephone from the telephone station, said preventing means comprising:
a snubber circuit coupled to the telephone network and coupled in parallel with the switchhook;
a zener diode coupled in series with the snubber circuit for producing high frequency harmonics of the ring signal;
a tone detector circuit for detecting signals on the telephone line within a specified frequency band, having an input coupled to the snubber circuit, the specified frequency band being within the communication bandwidth of the telephone network; and
microcomputer means, coupled to the output of the tone detector, for determining when a ring signal is being received and for preventing the apparatus from closing the switchhook when a ring signal is being received.

14. An apparatus as set forth in claim 13 wherein the zener diode also produces high frequency harmonics of pulse dial signals produced by a rotary telephone coupled to the telephone station.

15. An apparatus as set forth in claim 14 wherein the tone detector comprises a bandpass filter tuned to said specified frequency band within the communication bandwidth of the telephone network and a comparator having an input coupled to the output of the bandpass filter, the comparator changing state in response to abrupt changes in the output of the bandpass filter.

16. An apparatus as set forth in claim 15 wherein the tone detector is coupled to the snubber circuit through a transformer couple.

17. An apparatus as set forth in claim 16 wherein the apparatus comprises a fuel oil sensor unit.

18. An apparatus as set forth in claim 17 wherein communication between the sensor unit and the central processing station is carried out at said specified frequency band, said specified frequency band being substantially 350 Hz, and wherein the ring signal used by the telephone network is in the range of 15 to 68 Hz.

19. An apparatus as set forth in claim 18 wherein the comparator is a hysteretic comparator.

20. An apparatus as set forth in claim 19 wherein the zener diode has a dead-band of 20 volts.

* * * * *